United States Patent Office 3,544,650
Patented Dec. 1, 1970

1

3,544,650
CRYSTALLINE ALUMINOSILICATE CATALYST MODIFIED BY SOLID-STATE REACTION WITH ALKALI METAL HALIDE
William E. Garwood, Haddonfield, N.J., assignor to Mobil Oil Corporation, a corporation of New York
No Drawing. Filed Sept. 20, 1968, Ser. No. 761,302
Int. Cl. C07c 5/18; B01j 11/78
U.S. Cl. 260—683.3    12 Claims

ABSTRACT OF THE DISCLOSURE

A hydrogenation-dehydrogenation catalyst and method for preparing the same by contacting in the solid state an ammonium metal aluminosilicate with an alkali metal halide. A hydrogenation-dehydrogenation process carried out in the presence of such a catalyst.

BACKGROUND OF THE INVENTION

Field of the invention

This invention relates to aluminosilicate catalysts containing a hydrogenation-dehydrogenation component. More particularly, this invention relates to an aluminosilicate molecular sieve catalyst containing a hydrogenation-dehydrogenation component and having a substantial number of its cracking sites neutralized.

Discussion of the prior art

Many zeolite catalysts previously known, including those containing transition metals, have a significant amount of acid catalytic activity which causes cracking of a crackable hydrocarbon in contact therewith. In a hydrocarbon conversion process wherein hydrogenation-dehydrogenation is desired employing a zeolite catalyst having a hydrogenation-dehydrogenation component, these sites interfere with the desired reaction. Inevitably they lead to undesirable or unselective cracking, or to isomerization of the charge stock. In the case of an unsaturated hydrocarbon charge to be hydrogenated, polymerization occurs in the presence of the catalysts containing the acid sites. This decreases the overall selectivity. Hence, it has become desirable to provide a hydrogenation-dehydrogenation catalyst which has reduced acid sites so that the catalyst does not tend to promote undesirable or unselective cracking, isomerization or polymerization or any other acid catalyzed hydrocarbon conversion side reaction.

SUMMARY OF THE INVENTION

In accordance with this invention, a hydrogenation-dehydrogenation catalyst is prepared by contacting in the solid state an ammonium zeolite containing a hydrogenation-dehydrogenation component with an alkali metal halide at a temperature of at least 150° C. until at least a portion of the acid sites of said zeolite are neutralized.

The method of this invention generally entails the treatment of an ammonium metallo aluminosilicate wherein the metal is a hydrogenation-dehydrogenation component with sodium iodide at a temperature between about 150° C. and 800° C. for between about 1 hour and 24 hours. This treatment causes volatilization of the ammonium ion of the zeolite structure with a replacement of a sodium ion therefore, neutralizing acidity. The iodine atom is believed to be one positioned within the sodalite or other small cages of the zeolite and to function additionally as a neutralizing agent. This function of the iodine

2 atom is considered particularly surprising because iodine is generally regarded by those skilled in the art to enhance cracking activity and has thus not been regarded as a suitable substance for neutralizing the acid sites of a catalytic zeolite to render it less prone to catalyzing acid catalyzed hydrocarbon processes.

The zeolites which can be treated in accordance with this invention include those having a crystalline structure as determined by X-ray analysis and a porous structure consisting of a large number of cavities which are interconnected by a series of still smaller channels or pores. These cavities and pores are generally precisely uniform in size within a specific zeolitic material. Because of the pore structure, those materials having a pore size of about 5 angstroms can be used as shape selective catalysts whereby normal paraffins are permitted to enter the cavities and pores of the zeolite to the exclusion of isoparaffins. The zeolites containing a hydrogenation-dehydrogenation component which can be treated in accordance with this invention include both natural and synthetic zeolites. Among the synthetic zeolites are those known as A, Y, L, D, R, S, T, Z, E, F, Q, U, X. All can generally be described as having 3-dimensional network of $SiO_4$ and $AlO_4$ in a tetrahedra cross-linked by the sharing of oxygen atoms. Among the natural zeolites which can be treated in accordance with this invention are the following: gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, and the like.

The aluminosilicates treated in accordance with this invention are treated in the ammonium form since this form readily permits the solid state exchange for the alkali metal halide in contact with the zeolite. The exchange must be done in the solid state since utilization of solutions tends to keep the halide anion in the solution. Hence, it does not enter within the cages of the zeolite where it serves to neutralize the acid sites. It is to be understood that the above teachings with respect to the position of the various elements is theoretical and is merely set forth as a suggested explanation for an observed phenomenon.

The solid state exchange occurs generally at a temperature of at least 150° C., and preferably at a temperature between about 500° C. and 700° C. If the temperature is below 150° C., generally an insufficient amount of volatilization of the ammonium cation occurs, and thus only a limited amount of sodium exchange is possible. On the other hand, if the temperature exceeds 800° C. degradation or collapse of the zeolite can occur and no appreciable benefit is gained by operating at temperatures above that limit. Preferably the exchange occurs at between about 500° C. and 700° C.

The amount of alkali metal used and the length of time for the solid state exchange are not particularly critical. If only partial neutralization of the acid sites is desired, then an amount of alkali metal less than the stoichiometric amount will suffice. Generally, substantially complete neutralization of the acid sites is desired, and in that case at least a stoichiometric amount is employed. Suitably, an amount in excess of the stoichiometric amount can be employed to ensure substantially complete neutralization of the acid cracking sites of the aluminosilicate.

The time of contact at temperatures indicated above must be at least sufficient to neutralize a portion of the sites. Generally this means that the contact time must be at least about 1 hour, and preferably between about 5 hours and 24 hours. Utilization of any greater period of time is not harmful and only serves to further insure maximum neutralization of the acid sites by exchange of the ammonium ion with an alkali metal ion and placement of the halide ion within the zeolite.

The zeolites are treated in a form containing the hydrogenation-dehydrogenation component. This is a curious phenomenon, as it has been found that by treating an ammonium zeolite X with sodium iodide under the conditions above not only are the acid catalyst sites neutralized, but the composition showed substantially no other activity notwithstanding that it remains crystalline. No explanation is presently available to explain the success of the process on an ammonium metallo aluminosilicate compared with a non-metallo ammonium zeolite. However, it can be concluded that it is important to treat the zeolite in a form containing a hydrogenation-dehydrogenation component.

The hydrogenation-dehydrogenation component is suitably selected from the group consisting of oxides of metals, sulfides of metals and metals of Groups VI and VIII of the Periodic Table, and manganese and zinc. Representative of these metals are molybdenum, cobalt, chromium, tungsten, iron, nickel, the platinum group metals, as well as components of these metals, their oxides or sulfides. The ammonium zeolites can be prepared by base exchanging a naturally occurring or synthetic zeolite with a suitable ammonium compound such as ammonium chloride or ammonium sulfate in a suitable solution such as an aqueous solution. The exchange can occur by loading the zeolite in either its sodium or potassium form into a column and passing through the column in a downward direction an aqueous ammonium chloride solution until the alkali metal content is decreased to below 4% by weight, and preferably to below 1 percent by weight. The ammonium zeolite can then be exchanged, impregnated, or otherwise intimately combined with the metallic hydrogenation-dehydrogenation component. In that form, it is suitable for further treatment with the alkali metal halide in accordance with the process of this invention.

Of the alkali metal halides useful as solid state exchanges for interaction with the metallo ammonium zeolites in accordance with this invention, it is preferred to employ sodium iodide because of its ease of preparation and its ability to exchange for the ammonium cation and for the iodine to be positioned within the sodalite or other small cages of the crystalline aluminosilicate.

It is also preferred to employ sodium iodide because the iodide ion more readily enters the sodalite or other small cages and becomes trapped more readily than smaller halide ions such as chloride, bromide, and fluoride.

Employing the catalyst of this invention, heavy petroleum residual stocks, cycle stocks, etc., can be converted by hydrogenolysis at temperatures between 400° F. and 825° F. using molar ratios of hydrogen to hydrocarbon charge in the range between 2 and 80. The pressure employed will vary between 10 and 2000 p.s.i.g. and the liquid hourly space velocity between 0.1 and 10.

The alkali metal halide treatment of the inorganic oxide is believed to be more effective in reducing its acidity than, say, back exchanging the material to its sodium form. This is based upon data obtained which shows that the alpha value as calculated in accordance with the method of P. B. Weisz and J. N. Miale, Journal of Catalysts, vol. 4, No. 4, August 1965, pages 525–529, for sodium iodide treated Linde ammonium zeolite X is about 0.5, whereas the alpha value for the sodium exchanged zeolite X is 1.0, i.e., about twice as much. This alpha value represents the ability of the catalyst to crack certain materials, e.g., n-hexane compared to a standard aluminosilicate catalyst. Thus, the sodium exchanged zeolite does not have the same low acidity as the sodium iodide treated ammonium zeolite.

In order to more fully illustrate the nature of the invention and the manner of presenting the same, the following examples are presented. These examples include the best mode contemplated for carrying out the invention.

EXAMPLE 1

Five grams of nickel ammonium erionite, prepared by exchanging 10 grams of ammonium erionite with 216 cc. of 0.5 N aqueous nickel acetate solution over a period of 60 minutes at 100° C., was mixed in solid form with 2.0 grams of sodium iodide and heated at 480° C. for 16 hours. The material was water washed and dried at 100° C. The compositions of the nickel sodium iodide erionite and the nickel ammonium erionite are set forth below:

|  | Erionite | |
|---|---|---|
|  | NiNaI | NiNH$_4$ |
| Compositions, wt. percent: | | |
| Ni | 4.51 | 4.85 |
| Na | 5.45 | 0.1 |
| SiO$_2$ | 64.5 | 69.0 |
| Al$_2$O$_3$ | 14.3 | 16.2 |
| I | 0.53 | ------ |
| Fe | 2.15 | 2.02 |
| K | 2.38 | 2.54 |
| Ca | 0.45 | 0.64 |
| Mg | 0.37 | 0.36 |

The alpha value of the sodium iodide erionite catalyst was determined in accordance with the method of P. B. Weisz and J. N. Miale. The alpha value of the nickel sodium iodide erionite catalyst was 17.7, a substantial decrease in the alpha value of the untreated erionite which generally is about 9000. The catalyst is useful in shape selective conversion of charge stocks containing n-paraffins mixed with isoparaffins and cyclic compounds to methane. In this case, the nickel contributes to the cracking function of the catalyst and permits conversion selectively to methane, whereas such a mixture of hydrocarbons cracked over an untreated catalyst provides higher molecular weight alkanes such as propane.

EXAMPLE 2

Four grams of palladium ammonium zeolite T, made by addition of 0.95 gram PdCl$_2$ from a Soxhlet thimble to 30 grams of ammonium T in 600 cc. of refluxing water over a 20 hour period, was mixed in solid form with 2.2 grams of sodium iodide, then heated at 480° C. for 16 hours to effectuate solid state exchange, water washed as in Example 1 and dried. The respective compositions analyzed in accordance with the table below:

|  | PdNaIT | PdNH$_4$T | NH$_4$T | T |
|---|---|---|---|---|
| Compositions, wt. percent: | | | | |
| Pd | 1.68 | 1.78 | ------ | ------ |
| Na | 7.5 | <0.1 | 0.1 | 2.3 |
| K | 2.1 | 1.2 | 2.3 | 9.4 |
| SiO$_2$ | 65.2 | 74.2 | 75.8 | 65.3 |
| Al$_2$O$_3$ | 18.2 | 22.3 | 21.8 | 18.5 |
| I | 0.64 | ------ | ------ | ------ |

The alpha value of the PdNaIT catalyst was 1.8 indicating a very low content of cracking sites. The catalyst was calcined at 1000° F. and reduced with hydrogen at 900° F. It demonstrated excellent selectivity for dehydrogenation over cracking in the test of its ability to dehydrogenate propane.

The propane was dehydrogenated at various temperatures at atmospheric pressure, the temperatures being set forth in the table below. In the table the amounts of cracked products and propylene in terms of mole percent conversion based on propane are reported at the various temperatures employed. In column 2, the results of dehydrogenation of a propane feed employing the catalyst twice regenerated at 1000° F. are shown. In that run, the propane feed was passed over a pot containing iodine so that the hydrocarbon charged contained iodine in a mole ratio, $I_2$/propane of 1/2530.

| Catalyst condition mole ratio, $I_2$/propane:[1] | Fresh | | Twice regenerated (air, 1,000° F.) | |
|---|---|---|---|---|
| | nil | | 1/2,530 | |
| | Cracked prods. | $C_3$= | Cracked prods. | $C_3$= |
| 850 (454° C.) | 0.6 | 8.0 | 0.8 | 1.1 |
| 900 (482° C.) | 0.3 | 7.6 | 0.4 | 7.1 |
| 950 (510° C.) | 0.2 | 5.1 | 0.4 | 5.4 |
| 1,000 (538° C.) | 0.1 | 3.2 | 1.1 | 5.2 |
| 1,050 (566° C.) | 0.3 | 4.2 | 2.0 | 5.5 |
| 1,100 (593° C.) | 0.5 | 6.2 | 4.5 | 6.9 |
| 1,150 (621° C.) | | | 6.4 | 16.8 |
| 1,200 (649° C.) | | | 18.7 | 21.6 |

[1] Propane conv., mole percent to temp., ° F.

The initial propylene conversion of 8.0 mole percent at 850° F. is about the same as the equilibrium value, thus demonstrating the utility of the catalyst in a dehydrogenation process. It should be noted that the amount of cracked products is substantially lower than would otherwise be obtained employing a zeolite catalyst having the usual amounts of acid sites which tend to catalyze cracking. It should be noted, also, that the cracking is not appreciably increased at lower temperatures employing iodine in the feed. Use of iodine in the propane feed appreciably increases the yield of olefin employing a regenerated catalyst over employing the same catalyst without iodine in the hydrocarbon feed.

From the foregoing, it is apparent that a significantly useful process for reducing acid sites and acid catalytic behavior in zeolite catalysts has been provided. This process enables the preparation of catalysts which provide a good selectivity in hydrogenation-dehydrogenation processes.

The terms and expressions used herein have been used as terms of illustration and not of limitation as there is no intention, in the use of such terms and expressions, of excluding any equivalents, or portions thereof, as many modifications and departures are contemplated within the scope of the invention claimed.

I claim:
1. A method of preparing a hydrogenation-dehydrogenation catalyst which comprises contacting in the solid state a crystalline ammonium zeolite containing a hydrogenation-dehydrogenation component with an alkali metal halide at a temperature of at least 150° C. until at least a portion of the acid sites of said zeolite are neutralized.

2. A process according to claim 1 wherein said zeolite is contacted at a temperature between 150° C. and 800° C. for at least about 1 hour.

3. A process according to claim 2 wherein said alkali halide is sodium iodide.

4. A process according to claim 2 wherein said zeolite is selected from the group consisting of gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, zeolite A, Y, L, D, R, S, T, Z, E, F, Q, U, X.

5. A process according to claim 2 wherein said hydrogenation-dehydrogenation component is selected from the group consisting of metals, oxides and sulfides of metals of Groups VI and VIII, manganese, and zinc.

6. A catalyst prepared by the process of claim 1.

7. A process for performing a hydrogenation-dehydrogenation reaction involving a hydrocarbon charge which comprises contacting such charge in a reaction zone maintained under hydrogenation-dehydrogenation conditions with a catalyst prepared by the process of claim 1, said coditions including a temperature in the range 400–825° F., a pressure in the range 10–2000 p.s.i.g., and a space velocity in the range 0.1–1.0 LHSV.

8. A process according to claim 7 wherein the hydrocarbon charge is subjected to hydrogenolysis by contacting it with hydrogen in the presence of the catalyst prepared according to claim 1 at a temperature between 400° F. and 825° F. under a pressure between 10 and 2000 p.s.i.g., at a liquid hourly space velocity between 0.1 and 10 employing molar ratios of hydrogen to hydrocarbon in the range of between 2 and 80.

9. A process according to claim 8 wherein a halogen is added to said hydrocarbon charge.

10. A process according to claim 9 wherein said halogen is iodine.

11. A process according to claim 8 wherein said hydrocarbon charge is selectively converted by hydrogenolysis employing a catalytically active crystalline aluminosilicate having a pore size of 5 angstroms.

12. A process according to claim 11 wherein said crystalline aluminosilicate is selected from the group consisting of erionite, offretite, zeolite T and zeolite A.

References Cited
UNITED STATES PATENTS

| 3,126,426 | 3/1964 | Turnquest et al. | 260—683.3 |
| 3,354,078 | 11/1967 | Miale et al. | 208—120 |
| 3,383,431 | 5/1968 | Fishel | 260—683.3 |
| 3,403,108 | 9/1968 | Leftin et al. | 252—429 |

DELBERT E. GANTZ, Primary Examiner

G. E. SCHMITKONS, Assistant Examiner

U.S. Cl. X.R.

252—442, 455